UNITED STATES PATENT OFFICE.

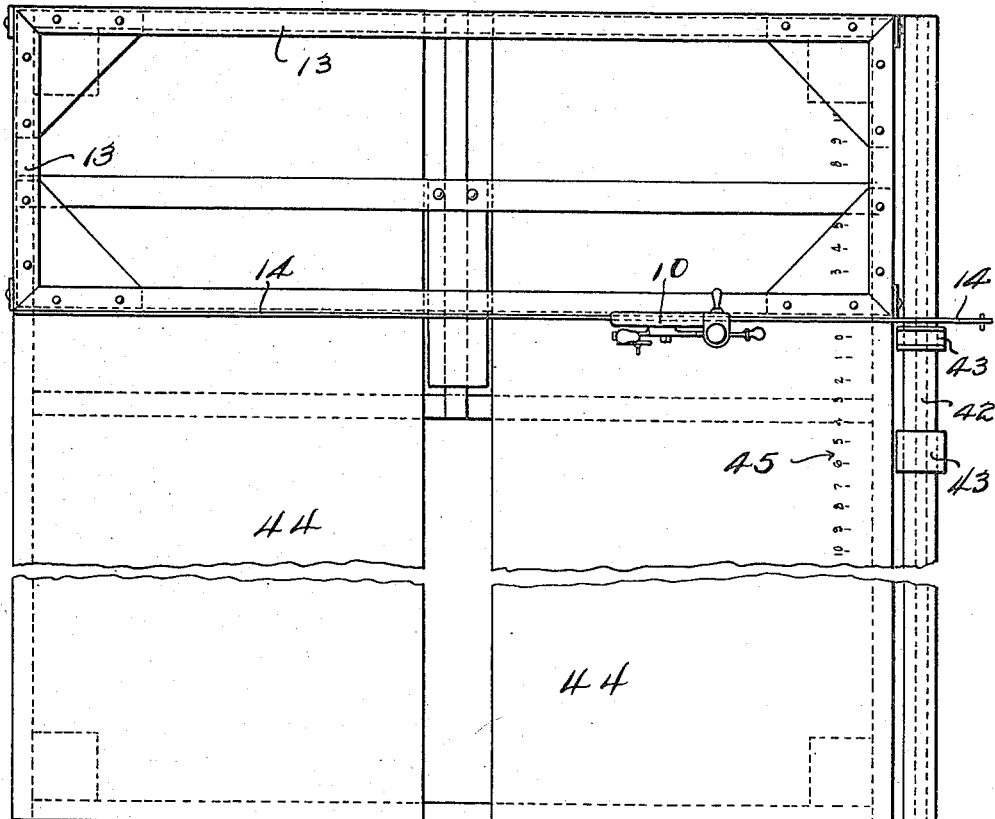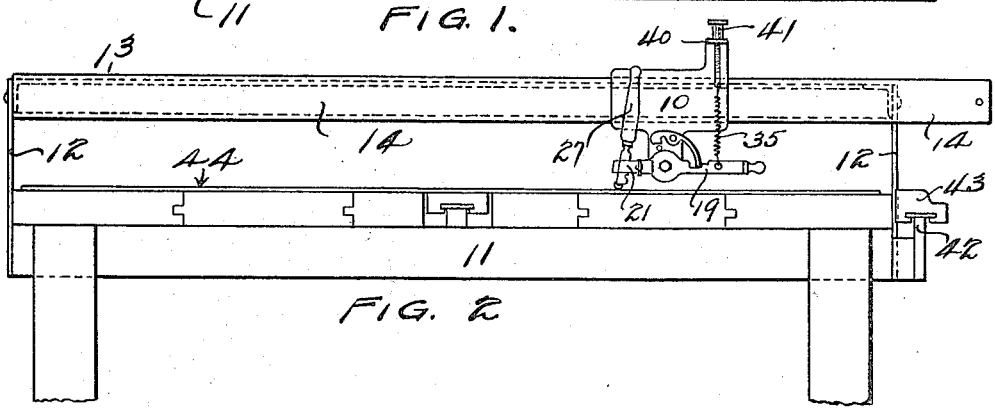

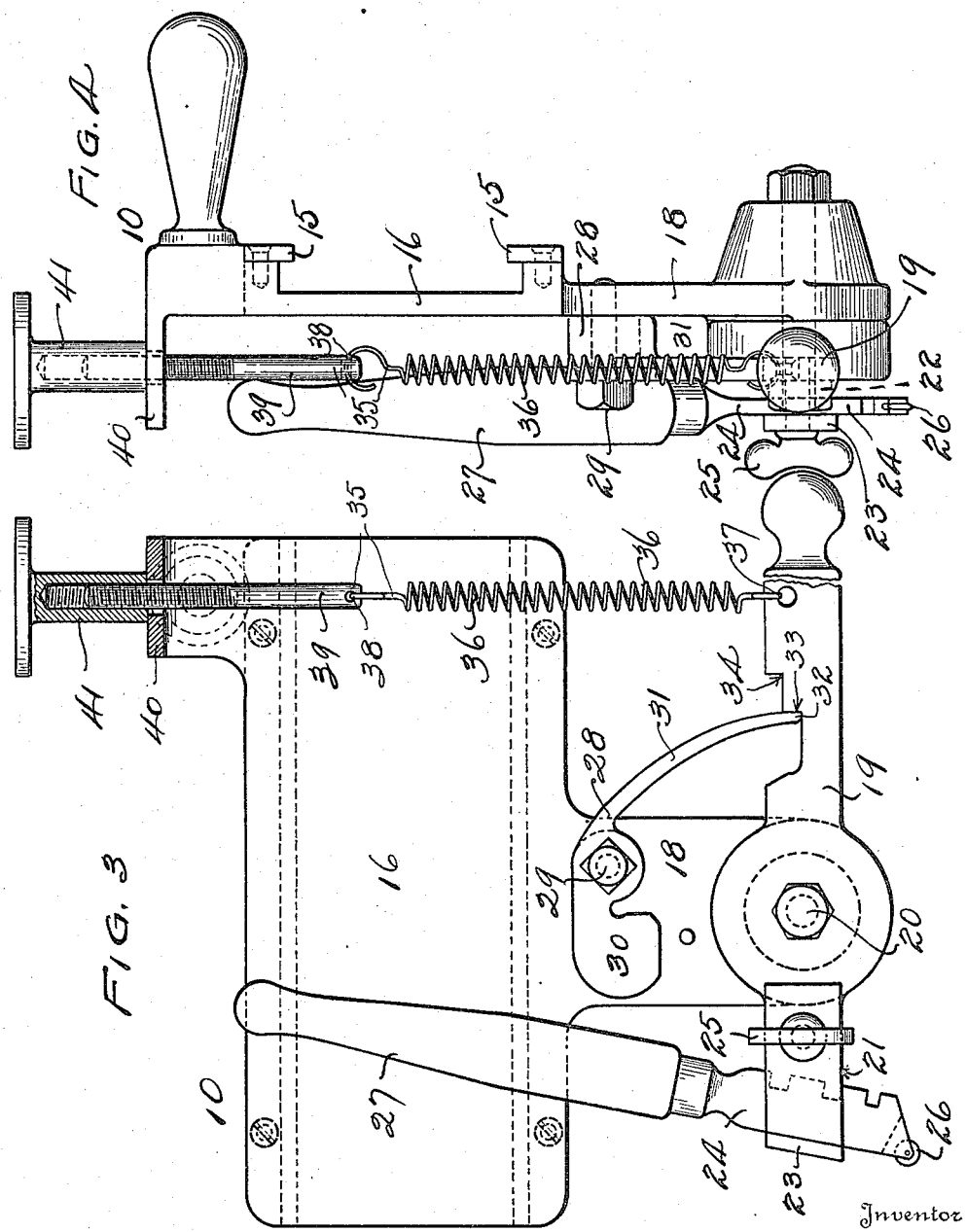

OSCAR BENSON, OF ALTOONA, PENNSYLVANIA.

GLASS-CUTTING MACHINE.

1,167,254.

Specification of Letters Patent.

Patented Jan. 4, 1916.

Application filed February 4, 1915. Serial No. 6,133.

*To all whom it may concern:*

Be it known that I, OSCAR BENSON, a subject of the King of Sweden, residing at Altoona, in the county of Blair and State of Pennsylvania, have invented certain new and useful Improvements in Glass-Cutting Machines, of which the following is a specification.

This invention relates to the general subject of glass cutting machines and has special reference to a substantial and reliable device of this character which greatly facilitates the handling and cutting of sheet and plate glass.

As a primary object the invention contemplates novel and improved means for holding the glass to be cut as well as improvements in the glass cutting device proper.

Another object of this device is to provide a sliding carriage adapted to be operatively positioned upon a guide rail above the glass to be cut, and at right angles to a second guide rail which is adapted to carry a plurality of special glass abutment blocks, while both said guide rails are carried by a table upon which the glass is laid when the operator cuts the glass.

A further object of this device is to provide improved clamping and holding means whereby the usual glass cutters readily procured in hardware stores may be easily clamped in the carriage.

With the above and other objects in view which will more readily appear as the nature of the invention is better understood, the same consists in the novel construction, combination and arrangement of parts hereinafter more fully described, illustrated and claimed.

It will of course be understood that this invention is naturally susceptible to a wide range of structural modification, without departing from the spirit or scope of the invention, but a preferred and thoroughly practical embodiment thereof is shown in the accompanying drawings, in which—

Figure 1 is a plan view of my improved glass cutting table together with the guide rails and glass cutter carriage positioned thereon. Fig. 2 is an end elevation of the parts shown in Fig. 1 of the drawings. Fig. 3 is a side elevation of the glass cutter carriage. Fig. 4 is an end view of the parts shown in Fig. 4 of the drawings.

Similar reference characters designate corresponding parts throughout the several figures of the drawings.

In carrying out this invention it has been found preferable to utilize a table or stand 11, so that the glass cutting carriage designated by the numeral 10 may be some distance above the floor, to permit an operator to operate the machine with ease and despatch. Upon the table 11 is preferably arranged a plurality of upstanding legs 12, carrying a rectangular frame 13 which is slidably mounted so as to be capable of a definite amount of movement in a longitudinal direction of the table 11. In connection with this sliding frame 13 it will be noted that there is slidably mounted on one side rail thereof the glass cutter carrying frame or carriage 10 above referred to. The said cutter carriage 10 being provided with means for engaging the guide rail 14 carried by the frame 13 is held thereupon in a slidable manner through the coöperation of the upper and lower rail engaging strips 15, which are secured to the frame 16 of the carriage by suitable fastening elements such as the machine screws 17. The said frame 16 is formed with a pendent leg element 18, carrying at its lower end the cutter tension arm 19 which is pivoted thereto as at 20 and provided with a suitable glass cutter clamping device 21. This device preferably consists of a stationary jaw 22 and a separable clamping jaw 23, between which the blade 24 of an ordinary glass cutter is firmly held by a clamping thumb screw 25. The cutter blade 24 is provided with the usual glass cutting disk 26 and handle 27, thus making it apparent that the usual glass cutters easily obtained on the market are readily applicable to this device, and that no special form of glass cutter is necessary or contemplated. The pendent arm 18 also carries a latching dog or pawl 28, pivoted thereto as at 29, above the pivot 20, and provided at one end with a counterweight 30, together with a curved pendent finger 31, the point 32 of which engages a notch 33 in the arm 19 to hold the disk 26 out of engagement with the glass to be cut when desired. An additional notch or shoulder 34 is also provided which may be engaged by the point 32 when the disk 26 is in operative position on the glass.

In order that the pressure of the disk 26 upon the glass may be the same throughout the operator's stroke there is provided a tension device designated in its entirety by the numeral 35, and which consists of a spring 36 attached to the arm 19 at the point 37, while the opposite end 38 is attached to an adjustable screw 39 which passes upward through an angled flange 40 of the frame 16. Above the flange 40 and abutting thereon is a tension nut or knob 41, which is used for the purpose of increasing or decreasing the tension of the spring 36 to vary the pressure of the disk 26 upon the glass to be cut by the operator. Further, in connection with the table it will be noticed that the same is provided with an additional guide rail 42 positioned at right angles with the carriage rail 14 and provided with a plurality of shiftable blocks 43 against which the glass abuts when being cut by the operator. The table 11 is further provided with a smooth top surface sheet 44 which is provided with a suitable scale 45, in feet and inches positioned adjacent the operator.

From the above description it will be obvious that this device not only contemplates an improvement in the glass cutting mechanism, but in addition provides simple means whereby the glass cut will be absolutely true. That is, the sides will be parallel and at right angles to each other. Without further description or elaboration it is believed that the many advantages will be readily apparent.

I claim:

1. A glass cutting device comprising a table, a frame work including a guide rail, means for mounting said frame work over said table to be shiftable longitudinally thereof, a glass cutter carriage slidably mounted on said guide rail and having a pendent portion, a cutter carrying arm pivoted to said pendent portion of the carriage and having cutter clamping means at one end and tension means connected with the other end, and means for locking said arm at the desired tension.

2. A glass cutting device comprising a table, a frame work including a guide rail, means for mounting said frame work over said table to be shiftable longitudinally thereof, a glass cutter carriage slidably mounted on said guide rail and having a pendent portion, a cutter tension arm pivotally carried by said pendent portion of the carriage, a clamping jaw at one end of said arm for clamping a cutter element, a spring having one end adjustably connected to the carriage and the other connected with said arm opposite the clamping jaw, and pivoted means for engaging said arm.

3. A glass cutting device comprising a table, a frame work including a guide rail, means for mounting said frame work over said table to be shiftable longitudinally thereof, a glass cutter carriage including a main frame having a guideway for slidably engaging said guide rail carried by the frame, and also having a pendent leg portion, a cutter carrying arm pivoted to said leg portion and having cutter clamping means, a flange projecting from the main frame of the carriage, a tension spring having one end adjustably connected to said flange and the other end secured to said cutter carrying arm, and a pawl pivotally carried by said carriage frame and having one end adapted to engage said cutter carrying arm.

4. A glass cutting device including a table, a shiftable rectangular frame element including a guide rail, means for mounting said frame work over the table to be shiftable longitudinally thereof, a glass cutter carriage slidable on said guide rail of the frame, and abutment blocks slidably mounted at one side of the table.

5. A glass cutting device comprising a table, a frame work having means for shiftably mounting the same over said table, a cutter carriage slidably mounted on said frame work, and a cutter carrying member in the form of a lever intermediately pivoted to said carriage and having cutter clamping means at one end and adjustable tension means connected with the other end, and means for engaging said cutter carrying member at one side of its pivot to regulate the position of the cutter clamping means.

In testimony whereof I affix my signature in presence of two witnesses.

OSCAR BENSON.

Witnesses:
 ALEX. WISE,
 N. E. GEE.

Copies of this patent may be obtained for five cents each, by addressing the "Commissioner of Patents, Washington, D. C."